United States Patent
Brisebois et al.

(10) Patent No.: US 10,743,222 B2
(45) Date of Patent: *Aug. 11, 2020

(54) FACILITATION OF HANDOVER COORDINATION BASED ON VOICE ACTIVITY DATA

(71) Applicant: AT&T Mobility II LLC, Atlanta, GA (US)

(72) Inventors: Arthur Richard Brisebois, Cumming, GA (US); Sanjay Gupta, Alpharetta, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/251,443

(22) Filed: Jan. 18, 2019

(65) Prior Publication Data
US 2019/0159083 A1    May 23, 2019

Related U.S. Application Data

(63) Continuation of application No. 15/701,719, filed on Sep. 12, 2017, now Pat. No. 10,219,192, which is a
(Continued)

(51) Int. Cl.
*H04W 36/02* (2009.01)
*H04L 12/841* (2013.01)
*H04L 12/835* (2013.01)

(52) U.S. Cl.
CPC ........ *H04W 36/023* (2013.01); *H04L 47/283* (2013.01); *H04L 47/30* (2013.01)

(58) Field of Classification Search
None
See application file for complete search history.

(56) References Cited

U.S. PATENT DOCUMENTS

| 5,371,780 A | 12/1994 | Amitay |
| 5,574,968 A | 11/1996 | Olds et al. |

(Continued)

FOREIGN PATENT DOCUMENTS

| AU | 766016 B2 | 10/2003 |
| EP | 1 367 846 A1 | 12/2003 |

(Continued)

OTHER PUBLICATIONS

Non-Final Office Action received for U.S. Appl. No. 14/718,786 dated Oct. 6, 2016, 25 pages.
(Continued)

*Primary Examiner* — Gregory B Sefcheck
*Assistant Examiner* — Sun Jin Kang
(74) *Attorney, Agent, or Firm* — Amin, Turocy & Watson, LLP

(57) ABSTRACT

A more efficient network can be achieved by leveraging an adaptive dejitter buffer. The dejitter buffer can be dynamically adjusted based off a network data analysis. A communication handover can be adjusted or shifted based on voice inactivity data related to a forecasted punctuation. The dejitter buffer memory/depth of a mobile device can also be adjusted in accordance with receiving a delay interruption length associated with another mobile device. Thereafter, the dejitter buffer memory can be filled with voice packet data to decrease a packet delay variation at the mobile device.

20 Claims, 12 Drawing Sheets

Related U.S. Application Data continuation of application No. 14/718,786, filed on May 21, 2015, now Pat. No. 9,794,842.

(56) References Cited

U.S. PATENT DOCUMENTS

| | | | |
|---|---|---|---|
| 5,711,004 A | 1/1998 | Blasiak et al. | |
| 6,148,206 A * | 11/2000 | Karanja | H04W 36/02 |
| | | | 455/436 |
| 6,549,523 B1 | 4/2003 | Gibbs et al. | |
| 7,236,785 B2 | 6/2007 | Ozluturk | |
| 7,382,770 B2 | 6/2008 | Bergman et al. | |
| 8,031,857 B2 | 10/2011 | Singh | |
| 8,145,215 B2 | 3/2012 | Olson | |
| 8,493,939 B2 | 7/2013 | Kezys et al. | |
| 8,775,186 B2 | 7/2014 | Shin et al. | |
| 2005/0176432 A1 | 8/2005 | Kamura et al. | |
| 2006/0251130 A1 * | 11/2006 | Greer | G10L 21/04 |
| | | | 370/508 |
| 2007/0072610 A1 | 3/2007 | Qiao et al. | |
| 2009/0170501 A1 * | 7/2009 | Olson | H04W 36/0088 |
| | | | 455/425 |
| 2009/0285186 A1 * | 11/2009 | Chin | H04W 68/12 |
| | | | 370/335 |
| 2011/0060590 A1 * | 3/2011 | Katae | G10L 13/10 |
| | | | 704/260 |
| 2011/0110330 A1 * | 5/2011 | Kim | H04W 36/02 |
| | | | 370/331 |
| 2013/0094472 A1 * | 4/2013 | Klingenbrunn | H04W 36/023 |
| | | | 370/331 |
| 2013/0294595 A1 * | 11/2013 | Michaud | H04M 3/42382 |
| | | | 379/202.01 |
| 2014/0219246 A1 * | 8/2014 | Khay-Ibbat | H04W 36/0022 |
| | | | 370/331 |
| 2014/0334442 A1 | 11/2014 | Kanamarlapudi et al. | |
| 2015/0003420 A1 | 1/2015 | Vangala et al. | |
| 2015/0146689 A1 * | 5/2015 | Fu | H04J 3/0632 |
| | | | 370/331 |
| 2015/0189089 A1 * | 7/2015 | Iltus | H04M 3/4286 |
| | | | 379/266.06 |
| 2016/0286042 A1 * | 9/2016 | Iltus | H04M 3/4286 |
| 2016/0286575 A1 * | 9/2016 | Weingertner | H04W 28/14 |

FOREIGN PATENT DOCUMENTS

| | | |
|---|---|---|
| EP | 1 479 250 A1 | 11/2004 |
| EP | 1 872 496 A1 | 1/2008 |
| EP | 2 063 651 A1 | 5/2009 |
| WO | 98/09454 A1 | 3/1998 |
| WO | 99/65266 A1 | 12/1999 |
| WO | 2011/064055 A1 | 6/2011 |

OTHER PUBLICATIONS

Kalaivani et al., "Vertical Handover Based on Voice Activity in Heterogeneous Network," Global Trends in Computing and Communication Systems, 2012, Springer Berlin Heidelberg, 2 pages.

Choi et al., "Performance Evaluation of Opportunistic Vertical Handover Considering On-Off Characteristics of voIP Traffic," IEEE Transactions on Vehicular Technology, 7 Pages.

Choi et al. "Voice-activity-based vertical handover in 3G-WLAN interworking networks," Electronic Letters, Oct. 2009, 2 Pages, vol. 45, No. 21, IET.

Stedman et al., "An Adaptive Mobile Multi-media Communicator," 8 Pages.

Huang et al., "Design and Performance Analysis for Data Transmission in Gsmigprs System with Voice Activity Detection," IEEE Transactions on Vehicular Technology, Jul. 2002, pp. 648-656, vol. 51, No. 4, IEEE.

Non-Final Office Action received for U.S. Appl. No. 15/701,719 dated Jul. 10, 2018, 24 pages.

* cited by examiner

FACILITATION OF HANDOVER COORDINATION BASED ON VOICE ACTIVITY DATA

RELATED APPLICATIONS

The subject application is a continuation of, and claims priority to each of, U.S. patent application Ser. No. 15/701,719 (now U.S. Pat. No. 10,219,192), filed Sep. 23, 2017, and entitled "FACILITATION OF HANDOVER COORDINATION BASED ON VOICE ACTIVITY DATA," which is a continuation of U.S. patent application Ser. No. 14/718,786 (now U.S. Pat. No. 9,794,842), filed May 21, 2015, and entitled "FACILITATION OF HANDOVER COORDINATION BASED ON VOICE ACTIVITY DATA," the entireties of which applications are hereby incorporated by reference herein.

TECHNICAL FIELD

This disclosure relates generally to facilitating timing adjustment of handovers according to voice activity data. More specifically, this disclosure relates to handovers of packet data between mobile devices based on voice activity data.

BACKGROUND

Jitter is the deviation from a true periodicity of a presumed periodic signal in electronics and telecommunications, often in relation to a reference clock source. Jitter can be observed in characteristics such as a frequency of successive pulses, a signal amplitude, or a phase of periodic signals. Jitter is a significant, and usually undesired, factor in the design of communications links. Jitter can be quantified in the same terms as all time-varying signals, e.g., root mean square (RMS), or peak-to-peak displacement. Also like other time-varying signals, jitter can be expressed in terms of spectral density (frequency content).

Jitter period is the interval between two times of maximum effect (or minimum effect) of a signal characteristic that varies regularly with time, and jitter frequency is its inverse. Jitter may be caused by electromagnetic interference (EMI) and crosstalk with carriers of other signals. Jitter can cause a display monitor to flicker, affect the performance of processors in personal computers, introduce clicks or other undesired effects in audio signals, and loss of transmitted data between network devices. The amount of tolerable jitter depends on the affected application.

In the context of computer networks, jitter is the variation in latency as measured in the variability over time of the packet latency across a network. Packet jitter is expressed as an average of the deviation from the network mean latency and is an important quality of service factor in assessment of network performance.

Jitter buffers or de-jitter buffers can be used to counter jitter introduced by queuing in packet switched networks so that a continuous play out of audio (or video) transmitted over the network can be ensured. The maximum jitter that can be countered by a de-jitter buffer is equal to the buffering delay introduced before starting the play-out of the media stream.

The above-described background relating to an adaptive dejitter buffering is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
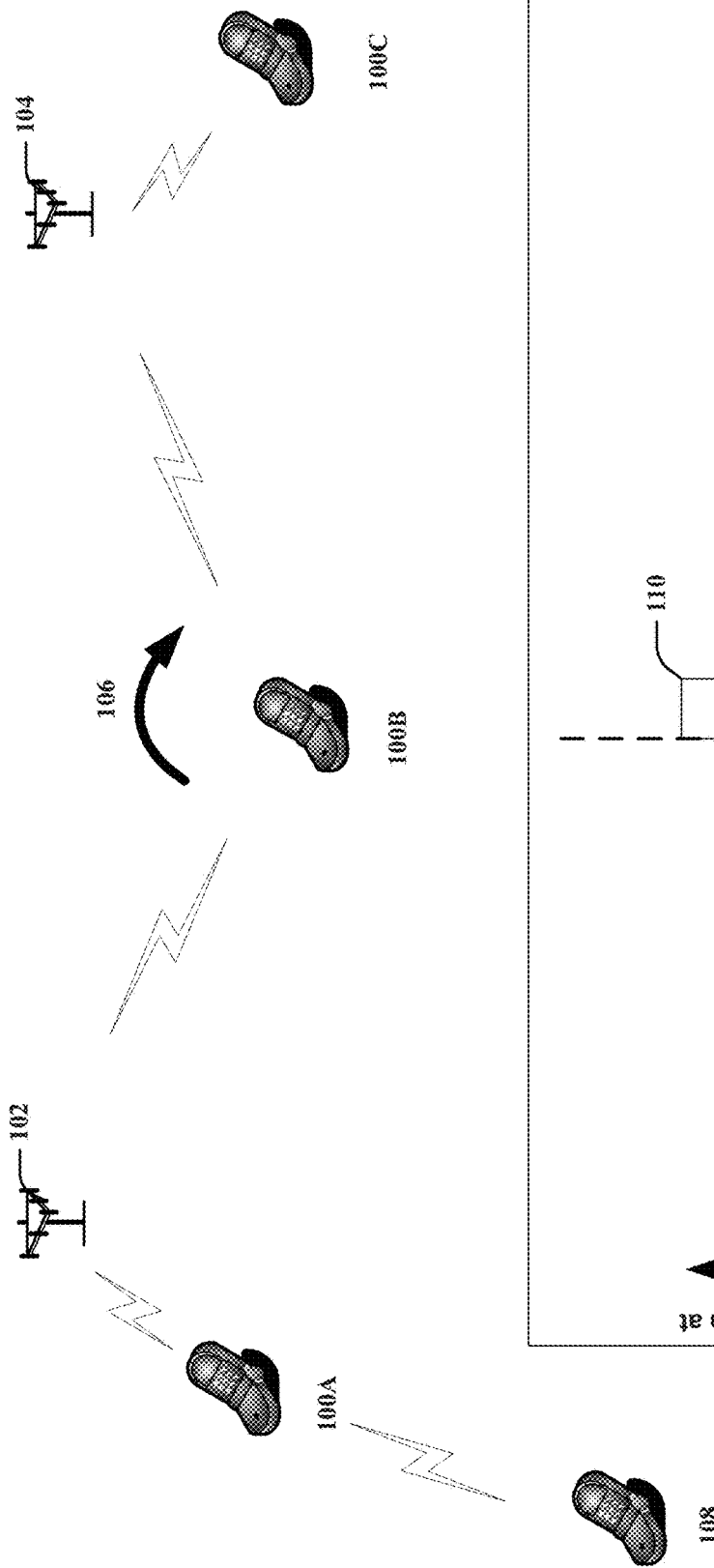
FIG. 1 illustrates an example wireless network comprising a mobile device handoff of communication between cells according to one or more embodiments.
Figure 1:
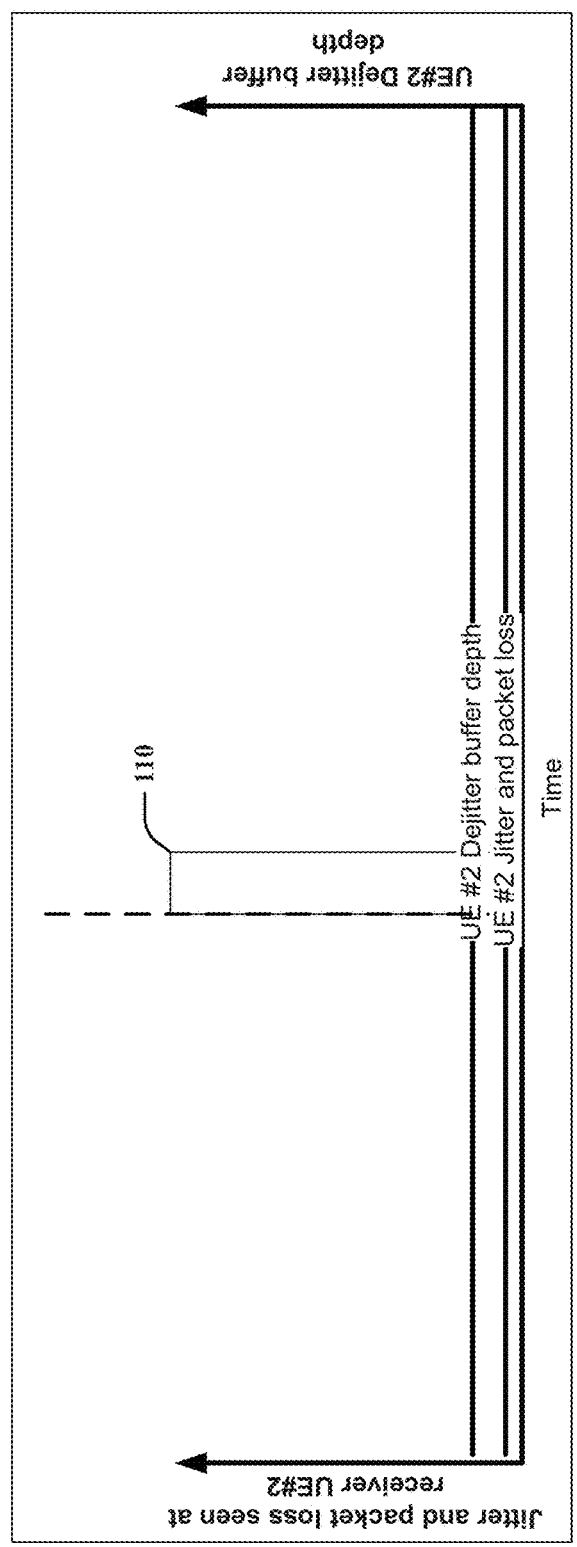

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview of the various embodiments presented herein, to correct for the above-identified deficiencies and other drawbacks of traditional cellular mobility management, various embodiments are described herein to facilitate jitter reduction between mobile devices and network devices based on voice inactivity data.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a computer readable storage medium) to facilitate transporting and transferring such methodologies to computers. The term article of manufacture, as used herein, is intended to encompass a computer program accessible from any computer-readable device, carrier, or media, including a non-transitory computer readable storage medium.

Described herein are systems, methods, articles of manufacture, and other embodiments or implementations that can facilitate jitter reduction within a wireless network. Facilitating jitter reduction can be implemented in connection with any type of device with a connection to a communications network such as: a mobile handset, a computer, a handheld device, or the like.

An adaptive downlink dejitter buffer can minimize downlink voice interruptions associated with voice over Internet protocol (VOIP) handovers between cell sites and radio technologies. Long term evolution (LTE), voice over LTE (VoLTE), and wireless fidelity (WIFI) are used herein as but an example of the various packet carrier communication types. However, these principles can be applicable to any packet voice technology with handovers. VOIP calls are more sensitive to handover packet flow interruptions for a number of reasons due to the nature of human voice comprehension.

Voice comprehension can depend upon reception of complete sounds (at the ear) in the correct order and cadence. Missing sounds can impact the ability of the mind to interpret words, and sounds cannot be interpreted as words if received out-of-order, in a discontinuous flow, or if played at an incomprehensible speed. Therefore, dejitter buffers are designed to reorder voice packets into a continuous flow prior to play-out of sound at a speaker. However, the reordering capability is limited by a dejitter buffer depth.

Voice conversations can comprise a real-time back and forth exchange of voice sounds for which the timing and content of latter sounds sent by one party is dependent upon the timing and content of prior sounds sent by (received from) another party. Voice conversations are severely slowed, and rendered nearly useless, if packets are buffered for a lengthy time (seconds) prior to play-out, specifically in the case for bursty data applications. Consequently, large dejitter buffers are impractical for conversational speech.

VOIP dejitter buffers can dynamically adjust towards a target balance of overall mouth-to-ear latency and robustness, which can range from a 20 ms to a 100 ms maximum depth depending upon historical packet flow characteristics such as jitter and packet loss. Dejitter buffers are generally kept for lengthier times when historical packet flow characteristics are poor, and they are shortened (for minimal mouth-to-ear latency) when historical packet flow characteristics improve. Although this methodology can be effective for static/stationary environments where transmission and reception changes are slow and gradual, this methodology can have relatively severe limitations within dynamic environments where transmission and reception changes are fast and dramatic. Non-stationary VoLTE calls, for example, face a constantly changing transmission/reception environment during handovers. In the handover case it can take between 60 m to 100 ms to restart the voice packet flow on a new cell after breaking the radio connection and packet flow with the old cell, even in ideal conditions where the historical packet flow characteristics are good before the handover.

Cross-technology handovers such as WIFI, VoLTE, and VoLTE to LTE may interrupt voice packet flows for hundreds of milliseconds; yet the historical packet flow characteristics could have been acceptable prior to the handover. In both cases, acceptable historical packet flow characteristics cause traditional dejitter buffers to become quite shallow (for example 20 ms) up until the handover. When the handover does occur, downlink voice packets can be buffered and/or forwarded in the packet core and/or radio schedulers until the flow is restarted on the new cell. As mentioned previously, this can cause packets to arrive at a receiver between 60 ms to 100 ms or later. Unfortunately, few of these buffered and forwarded packets are played out at the receiving end because the dejitter buffers were previously shortened (for example to 20 ms) based on an ideal transmission/reception methodology just before the handover. Consequently, at the receiver end, any packets delayed by more than the dejitter buffer limit (for example 20 ms) are discarded before play-out, which can result in noticeable voice interruptions and other impairments at handover.

This disclosure proposes a technique to offset temporary handover packet interruptions between mobile devices based on voice activity data. This can allow additional buffered and forwarded voice packets to be played during and after handover, rather than be discarded, thereby reducing the voice interruption at handover. A VOIP dejitter buffer algorithm (a component of the VOIP "stack" in a user equipment device) can monitor the radio for signs of upcoming handover and proactively increase the dejitter buffer size before the handover actually occurs. After the handover is complete (and until the next handover) the dynamic dejitter buffer algorithm can revert to the traditional use of historical packet flow characteristics to determine the optimal dejitter buffer depth. The aforementioned technique can comprise three primary components: upcoming handover detection, voice activity gap detection/prediction, and handover execution.

During the upcoming handover detection process, upon arrival to each new LTE carrier, via call setup or handover, the mobile device/user equipment (UE) radio can receive a set of handover instructions from the evolved node b (eNB). Pertinent instructions include criteria for when to take handover measurements, which frequencies to measure, and relative signal strength of old versus new cell (hysteresis) before handover is to be initiated. The user equipment (UE) radio follows these instructions and receives/analyzes measurements until specified criteria are met. When a communication transmitting UE radio finds a neighbor cell (handover candidate) it can monitor and predict uplink/downlink audio data for voice activity gaps. The UE can avoid/delay handovers during periods of actual or predicted voice activity and initiate handovers during periods of predicted or actual voice inactivity.

A transmitting UE can inform a receiving UE VoLTE stack (containing the dejitter buffer) that a handover is about to occur via a "transmission handover detection" message. The "transmission handover detection" message can be sent to the receiving UE. Furthermore, the transmitting UE can wait for a "ready for transmission" response message from the receiving UE or a determined timeout interval.

The transmitting mobile device can also send a "handover detection" message from its radio to its VoLTE stack that can comprise key handover type criterion such as: intra-LTE plus intra-frequency (shortest interruption), intra-LTE plus inter-frequency (longer interruption), inter radio access technology (IRAT) WIFI to LTE (longest interruption), and/or poor radio conditions (for example transmission time interval bundling). The transmitting UE radio can also wait for a "ready for handover" response from the dejitter buffer. The process can comprise three primary components: upcoming handover detection, real voice activity gap detection plus prediction, and handover execution.

During the upcoming handover detection, upon arrival to each new LTE carrier, via call setup or handover, the UE radio can receive a set of handover instructions from the eNB. Instructions can include criteria for when to take handover measurements, which frequencies to measure and relative signal strength of old versus new cells (hysteresis) before handover is to be initiated. The UE radio can follow these instructions, and receive and analyze measurements until the criteria are met. When the UE radio finds a neighbor cell (handover candidate) that meets the requirements it can check for voice activity gaps before sending a measurement report to initiate the handover.

Voice activity gap detection/prediction can differentiate voice from noise and identify and/or predict voice gaps. Real-time predictive speech to text conversion can be used to compare sound (from microphone or to speaker) to a letter, word, and/or punctuation patterns. If the sounds match letters and words, then they can be converted to text and/or words. Otherwise, the sounds can be excluded. The proposed technique in this disclosure can leverage the real voice activity detection mechanism and use the same logic to differentiate voice from other sounds. If the sound can be converted to text, then the real voice activity can be detected. If the sound cannot be converted to text, then it can represent a period of voice inactivity.

Predictive speech-to-text mechanisms can also look for ends of words, pauses, and ends of sentences to automatically add punctuation. They can detect intonation at ends of voice sounds to determine if the punctuation should be a comma, a period, or a question mark. The punctuation can be an extremely valuable predictor for what is likely to happen next. For example, no text can be an indication that neither speaker is currently speaking. This can generally be a sign that someone is going to speak soon because a trailing voice inactivity gap following no text is unlikely. If there is text, but no punctuation, it can be representative that the first speaker has not finished speaking, and therefore a trailing voice inactivity gap following no punctuation is unlikely.

A comma can be an indication that the first speaker is likely to say more soon. The trailing voice inactivity gap following a comma can be short. However, a period can be an indication that the first speaker is likely to take a breath, speak more, or wait for a response from the second speaker. The trailing voice inactivity gap following a period can be long enough to allow a handover interruption to occur unnoticed. A question mark can be an indication that the first speaker is waiting for the second speaker to comprehend, think about, and/or respond to what has been said. The trailing voice inactivity gap following a question mark can also be long enough to allow a handover interruption to occur unnoticed. ☐The UE can analyze the uplink/downlink predictive speech to text output and predict trailing voice activity gaps and opportunities for an unnoticed handover according to the following case priority: 1) question mark: significant trailing voice activity gap likely—opportunity for immediate handover; 2) period: trailing voice activity gap likely—opportunity for immediate handover; 3) comma: trailing voice activity gap likely short—immediate handover if same technology or wait for the question mark or the period if the handover is to another technology (for example WIFI to LTE); 4) text, no punctuation: in-progress voice activity—question mark or period 5) no text: voice activity likely soon—wait for text and question mark or period.

During the handover execution, the UE has already determined that the handover is required according to a traditional handover measurement (signal strength) criterion. Next, the UE can consider handover timing according to the predicted trailing voice activity gap based upon a case priority. In case 1 and 2, with a likely trailing voice activity gap, the UE can send the measurement report immediately, thus triggering an immediate handover. In case 3 with a short gap possible, the UE can either handover immediately (if same technology) or await case 1 or 2 (if IRAT handover between WIFI and LTE, for example). In case 4 and 5 (in-progress or upcoming voice activity soon) the UE can wait for case 1 or 2, a pre-defined timer expiration, or signal quality below a threshold (whichever occurs first). Therefore, this methodology can use real voice activity detection to predictive speech-to-text conversion and analysis in the UE and place handover events where they can be noticed least.

The aforementioned technique can result in a more transparent VOIP handover with less interruption and less associated voice quality degradation. For traditional intra-technology handovers, the voice quality experience can be improved, and this technique can be used to enable VOIP call mobility between radio technologies and layers that may otherwise be impractical or insufficient for VOIP. For example WIFI and other unlicensed spectrum technologies have been deemed impractical or of low quality for voice due to the lack of smooth mobility with large-area wireless technologies over licensed spectrum. Inter-technology handovers have traditionally been difficult to coordinate and typically have long packet flow interruptions. Consequently, this technique can make the VOIP call quality and subscriber experience more robust and tolerant in spite of the inter-technology packet flow interruptions.

In one embodiment, described herein is a method comprising receiving gap data related to a handover condition associated with a mobile device, analyzing the gap data to determine a type of the handover, and increasing a memory size of a dejitter buffer based on the gap data and the type of the handover. After increasing the memory size of the dejitter buffer voice packet data can be stored to fill a capacity of the increased memory size of the dejitter buffer. Furthermore, other data related to the handover condition being satisfied can be sent to the mobile device.

According to another embodiment, a system can facilitate, receiving handover condition data associated with a signal handover of a mobile device between a first network device and a second network device. The system can then analyze the handover condition data to determine a handover interruption length, resulting in handover interruption length data. The system can also defer the signal handover based on voice inactivity data. Thereafter, the system can send an indication, that the handover condition has been satisfied, to the mobile device.

According to yet another embodiment, described herein is a computer readable medium that can perform the operations comprising receiving voice packet data related to a handover detection message and analyzing the voice packet data to determine whether a condition related to a voice packet data size has been satisfied. Based on the condition being satisfied, the computer readable medium can shift a signal handover and increase a size of a dejitter buffer, wherein the dejitter buffer decreases a packet delay variation associated with queuing the voice packet data. The computer readable medium can then store the voice packet data in the dejitter buffer and send an indication of such to a mobile device.

These and other embodiments or implementations are described in more detail below with reference to the drawings.

Referring now to FIG. 1, illustrated is an example wireless network comprising a mobile device handoff of communication between cells according to one or more embodiments. It should be noted that a mobile device 100A, 100B, 100C can be represented at various points in time as it transitions from one location to another location. At an initial point in time, the mobile device 100A can communicate with a wireless network via a base station 102. As the mobile device 100A moves and gets to a point where a communication handover 106 can happen between the base station 102 and another base station 104, the mobile device 100B can transition communication to the base station 104. Thereafter the mobile device 100C can be in communication the base station 104.

The graph in FIG. 1 depicts the jitter packet loss of the mobile device (UE #2) 108, which can be in communication with the mobile device 100A, 100B, 100C as it transitions communication between the base stations 102 104. While the mobile device 100A is near the base station 102, the jitter and packet loss associated with the communication of the mobile device (UE #2) 108 can remain constant. However, as the mobile device 100B transitions between the base stations 102 104, there can be a spike 110 in the jitter and the packet loss during the handover 106. The spike 110 in the jitter and the packet loss during the handover 106 can be experienced by the mobile device (UE #2) 108 causing a noticeable interruption in service. Thereafter, as the mobile device 100C communicates with the base station 104, the jitter and the packet loss can be returned to a constant level for the mobile device (UE #2) 108 as it communicates with the mobile device 100C.

Figure 2:
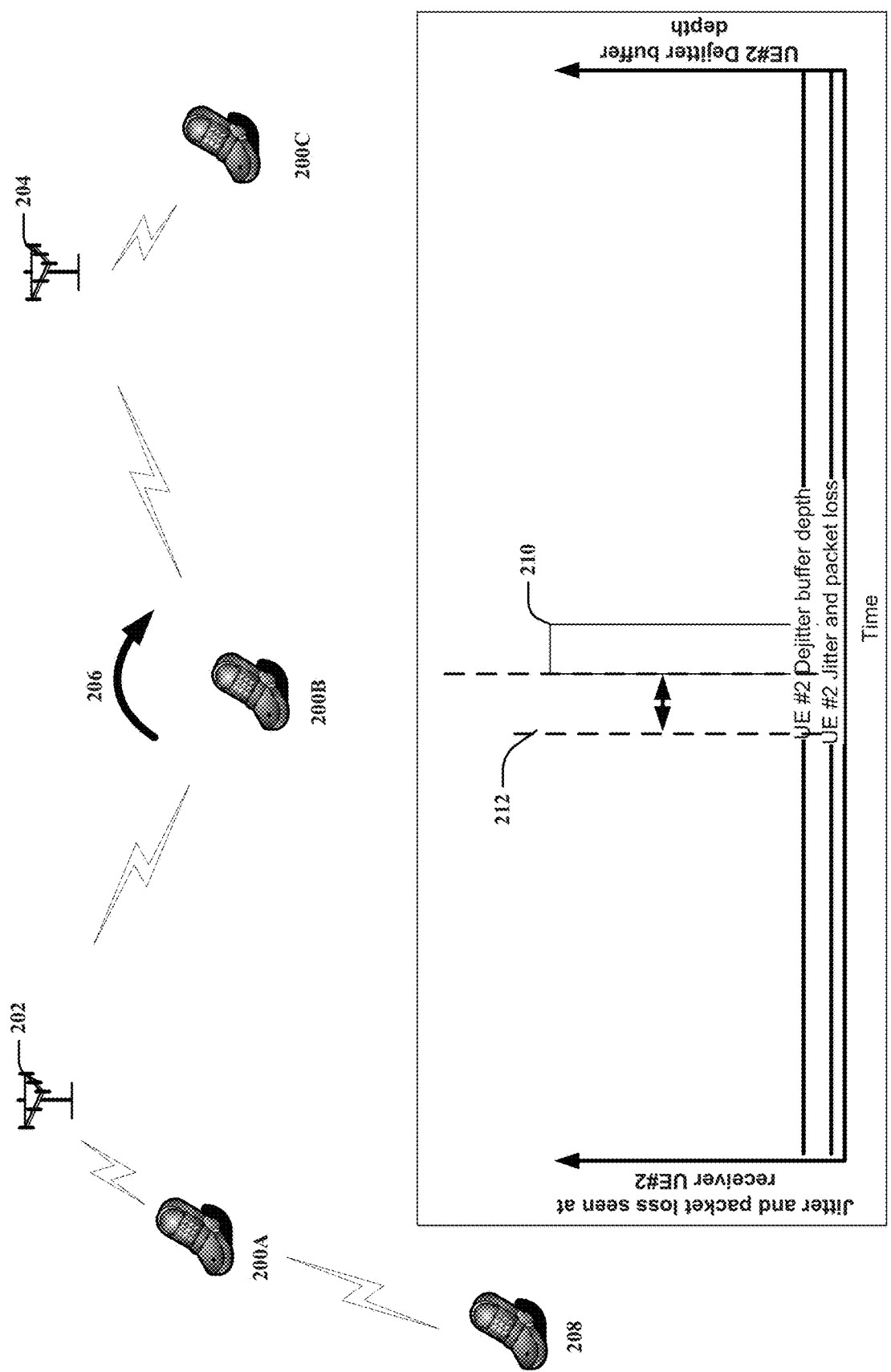
FIG. 2 illustrates an example wireless network generating a dejitter buffer of a mobile device based on voice inactivity and another mobile device handoff of communication between cells according to one or more embodiments.

Referring now to FIG. 2, illustrated is an example wireless network generating a dejitter buffer of a mobile device based on voice inactivity and another mobile device handoff of communication between cells according to one or more embodiments. It should be noted that a mobile device 200A, 200B, 200C can be represented at various points in time as it transitions from one location to another location. At an initial point in time, the mobile device 200A can communicate with a wireless network via a base station 202. As the mobile device 200A moves and gets to a point where a communication handover 206 can happen between the base station 202 and another base station 204, the mobile device 200B can transition communication to the other base station 204. Thereafter the mobile device 200C can be in communication with the base station 204.

The graph in FIG. 2 depicts the jitter packet loss of the mobile device (UE #2) 208, which can be in communication with the mobile device 200A, 200B, 200C as it transitions communication between the base stations 202 204. While the mobile device 200A is near the base station 202, the jitter and packet loss associated with the communication of the mobile device (UE #2) 208 can be at a minimal level. However, as the mobile device 200B transitions between the base stations 202 204, there can be a spike 210 in the jitter and the packet loss experienced by the mobile device 208 during the handover 206. The spike 210 in the jitter and the packet loss during the handover 206 can cause a noticeable interruption in service for the mobile device (UE #2) 208. Therefore, when the mobile device 200A finds a neighbor base station 204 it can check for voice activity gaps before sending a measurement report to initiate the handover. The voice activity gap detection and prediction can differentiate voice from noise and identify and/or predict voice gaps. Real-time predictive speech-to-text conversion can be used to compare sound (from microphone or to speaker) to a letter, word, and/or punctuation patterns. Once a voice activity gap has been predicted/determined, the UE can determine an opportunity for an unnoticed handover according to a case priority.

To compensate for the spike 210 in the jitter and packet loss, during the handover 206, the dejitter buffer 210 of the mobile device 208 can be deferred 212 to fall within the voice activity gap. The mobile device 208 VoLTE stack can shift 212 the dejitter buffer 210 and add a cache of voice packets to be played during handovers while there is a forecasted voice inactivity during the handover 206. A larger dejitter buffer 210 depth can also allow for late reception, reordering, and play out of voice packets buffered and forwarded during and after the handover 206 process. The depth of the enlarged dejitter buffer 210 can be proportional to the expected packet flow interruption for a handover type. Thereafter, as the mobile device 200C communicates with the base station 204, the jitter and the packet loss can be returned to a minimal level for the mobile device (UE #2) 208 as it communicates with the mobile device 200C.

Figure 3:
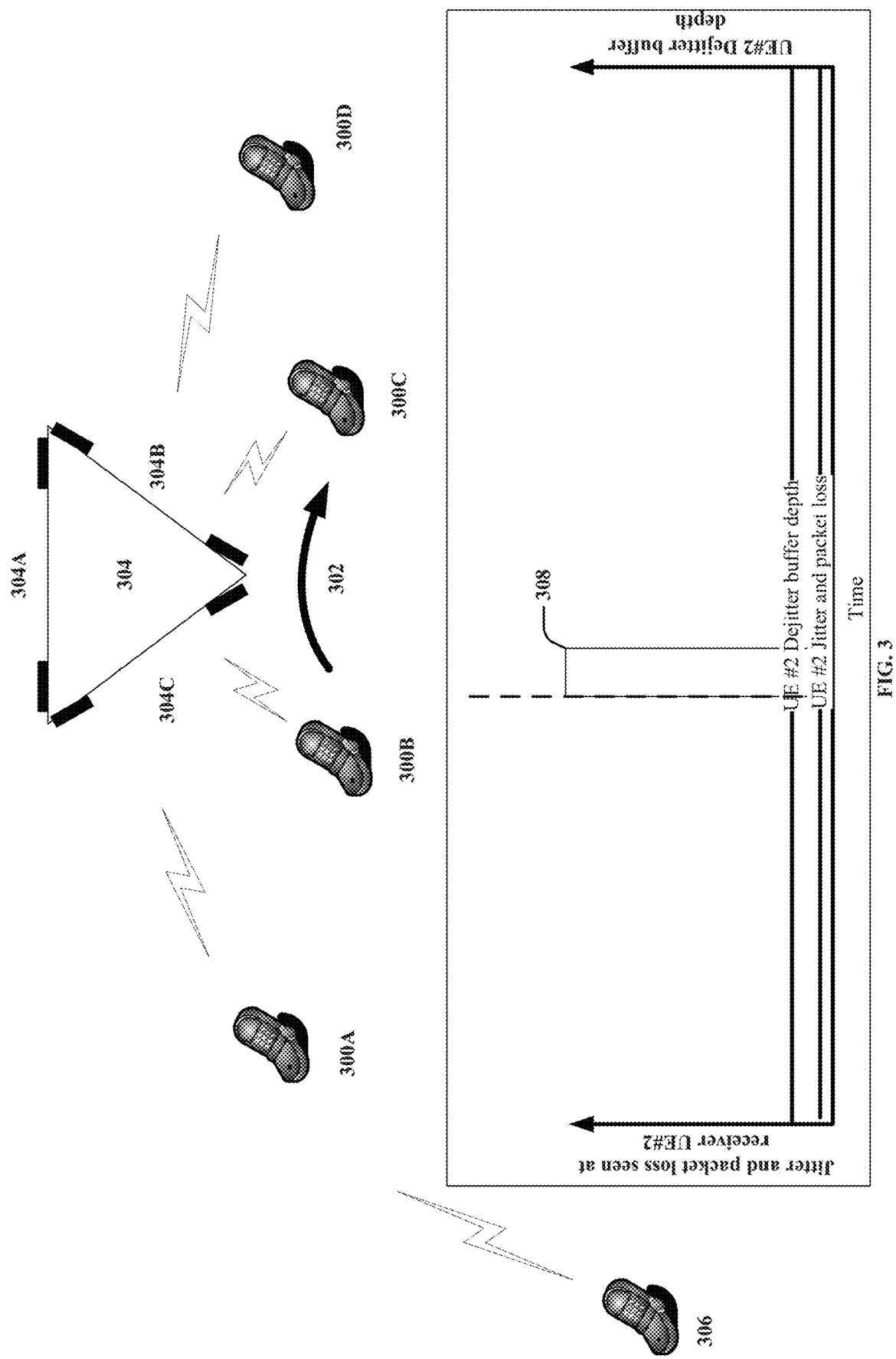
FIG. 3 illustrates an example wireless network comprising a mobile device handoff of communication between cell site locations according to one or more embodiments.

Referring now to FIG. 3, illustrated is an example wireless network comprising a mobile device handoff of communication between cell site locations according to one or more embodiments. It should be noted that a mobile device 300A, 300B, 300C, 300D can be represented at various points in time as it transitions from one cell site location 304A, 304B, 304C to another cell site location 304A, 304B, 304C. The cell site 304 can have several cell site locations 304A, 304B, 304C. At an initial point in time, the mobile device 300A can communicate with the cell site 304C from a distance. As the distance is decreased, the mobile device 300B can communicate with the cell site location 304C. As the mobile device transitions between the cell site location 304C and another cell site location 304B a communication handover 302 can happen between the cell site locations 304C 304B. Thereafter the mobile device 300D can be in communication with the other cell site location 304B as its distance from the other cell site location 304B increases.

The graph in FIG. 3 depicts the jitter and packet loss of another mobile device 306 in communication with the mobile device 300A, 300B, 300C, 300D as it transitions between the cell site locations 304A, 304B, 304C. While the mobile device 300A is further away from cell site location 304C, the jitter and packet loss associated with the other mobile device 306 communication can remain constant. However, as the mobile device 300B gets closer to the cell site location 304C and begins transitioning communication to the cell site location 304B, there can be a spike 308 in the jitter and the packet loss of the other mobile device 306 during the handover 302. Thereafter, as the mobile device 300C 300D communicates with the cell site location 304B, the jitter and the packet loss of the other mobile device 306 can return to a constant level as the mobile device 300D increases its distance from the cell site location 304B.

Figure 4:
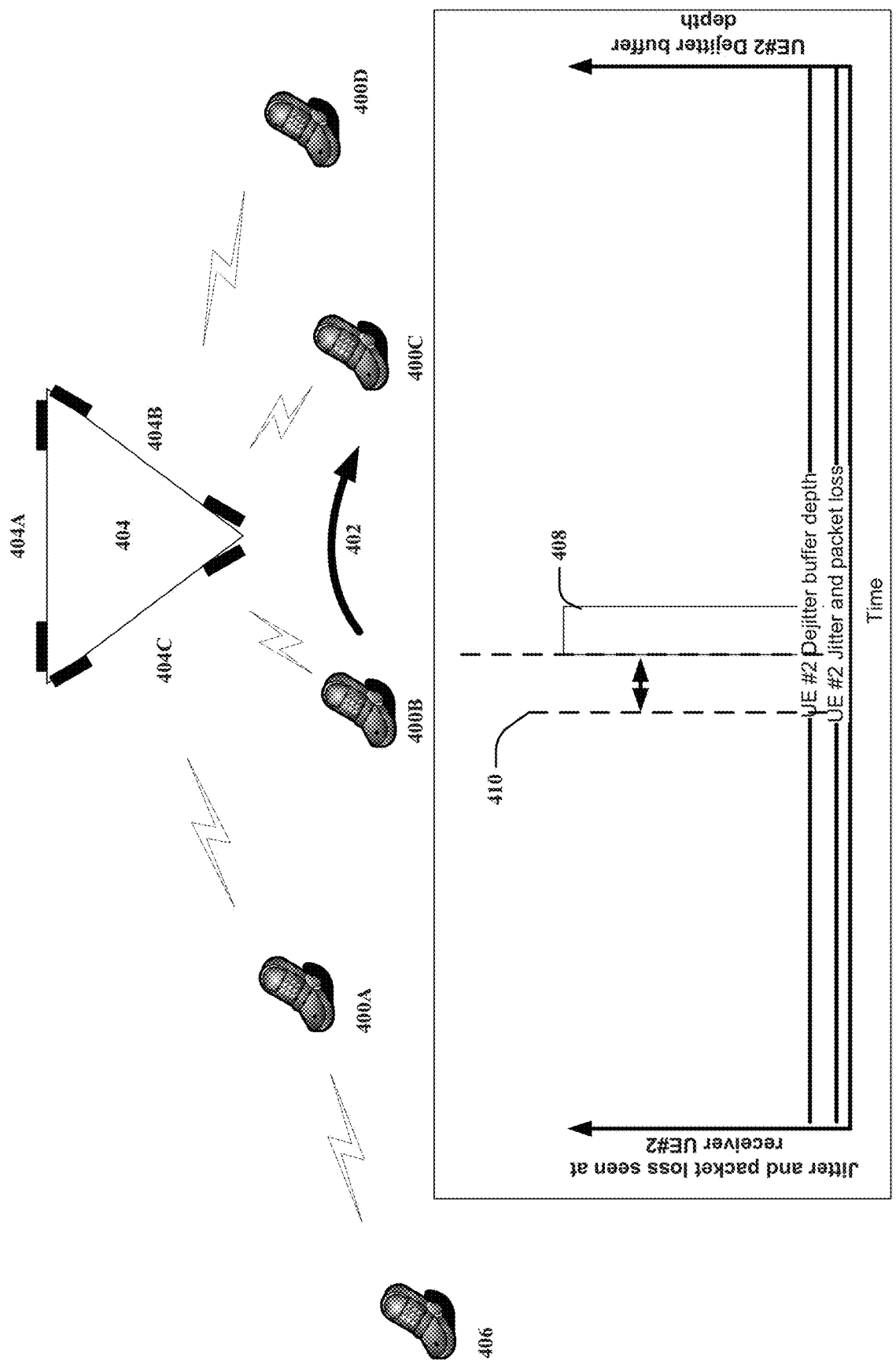
FIG. 4 illustrates an example wireless network generating a dejitter buffer of a mobile device based on voice inactivity and another mobile device handoff of communication between cell site locations according to one or more embodiments.

Referring now to FIG. 4, illustrated is an example wireless network generating a dejitter buffer of a mobile device based on voice inactivity and another mobile device handoff of communication between cell site locations according to one or more embodiments. It should be noted that a mobile device 400A, 400B, 400C, 400D can be represented at various points in time as it transitions from one cell site location 404A, 404B, 404C to another cell site location 404A, 404B, 404C. The cell site 404 can have several cell site locations 404A, 404B, 404C. At an initial point in time, the mobile device 400A can communicate with the cell site 404C from a distance. As the distance is decreased, the mobile device 400B can communicate with the cell site location 404C. As the mobile device transitions between the cell site location 404C and another cell site location 404B a communication handover 402 can happen between the cell site locations 404C 404B. Thereafter, the mobile device 400D can be in communication with the other cell site location 404B as the mobile devices 400D distance from the other cell site location 404B increases.

The graph in FIG. 4 depicts the jitter and packet loss of the mobile device 406 in communication with the mobile device 400A, 400B, 400C, 400D as it transitions between the cell site locations 404A, 404B, 404C. While the mobile device 400A is further away from cell site location 404C, the jitter and packet loss associated with the other mobile device 406 communication can be at a constant level. However, as the mobile device 400B gets closer to the cell site location 404C and begins transitioning communication to the cell site location 404B, there can be a spike 408 in the jitter and the packet loss of the other mobile device 406 during the handover 402. The spike 408 in the jitter and the packet loss during the handover 402 can cause a noticeable interruption in service for the other mobile device 406. Therefore, when the mobile device 400B finds a neighbor cell site location 404B it can check for voice activity gaps before sending a measurement report to initiate the handover 402. The voice activity gap detection and prediction can differentiate voice from noise and identify and/or predict voice gaps. Real-time predictive speech-to-text conversion can be used to compare sound (from microphone or to speaker) to a letter, word, and/or punctuation patterns. Once a voice activity gap has been predicted/determined, the UE can determine an opportunity for an unnoticed handover according to a case priority.

To compensate for the spike 408 in the jitter and packet loss, during the handover 402, the dejitter buffer 408 of the mobile device 406 can be shifted/deferred 410 to fall within the voice activity gap. The mobile device 406 VoLTE stack can shift/defer 410 the dejitter buffer 408 and add a cache of voice packets to be played during handovers 402 while there is a forecasted voice inactivity during the handover 402. A larger dejitter buffer 408 depth can also allow for late reception, reordering, and play out of voice packets buffered and forwarded during and after the handover 402 process. The depth of the enlarged dejitter buffer 408 can be proportional to the expected packet flow interruption for a handover type. Thereafter, as the mobile device 400C 400D communicates with the other cell site location 404B, the jitter and the packet loss of the other mobile device 406 can return to a constant level as the mobile device 400D increases its distance from the other cell site location 404B.

Figure 5:
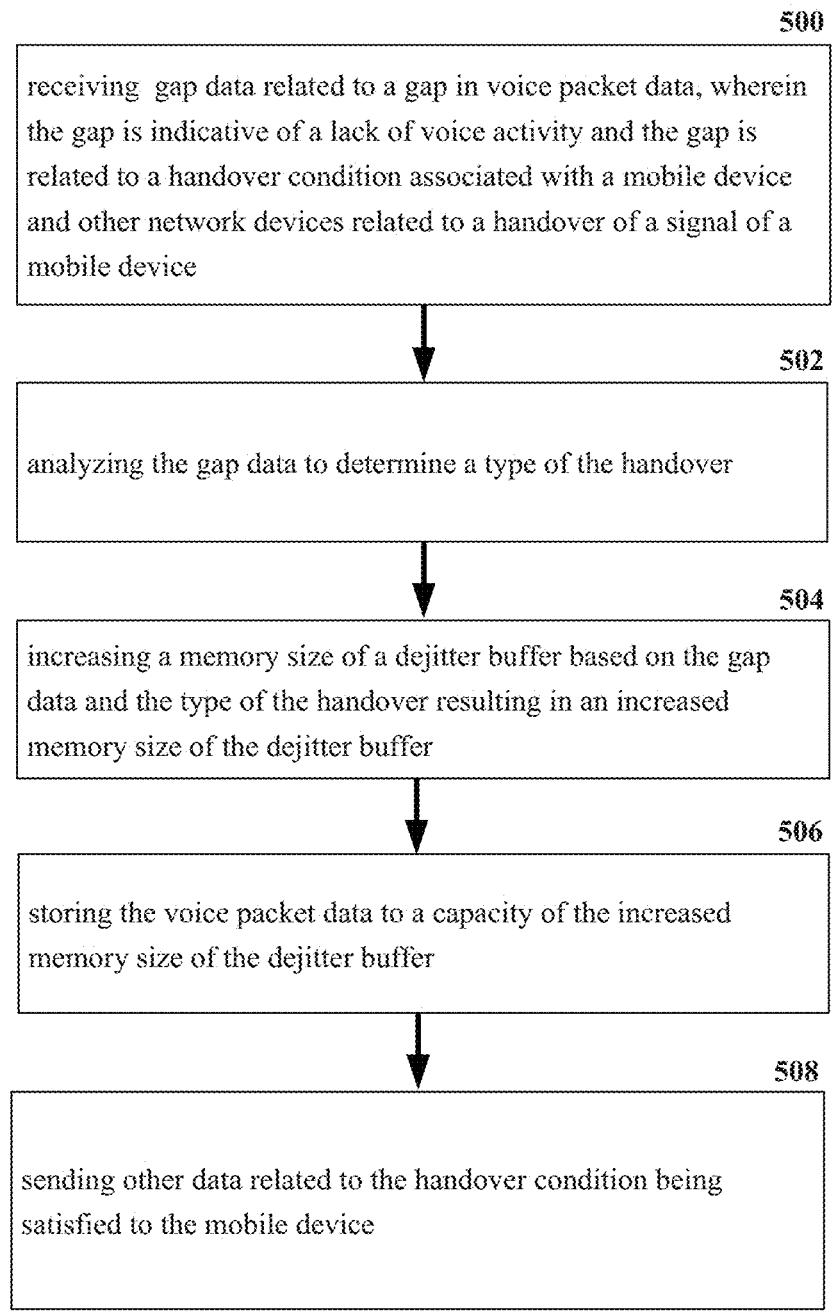
FIG. 5 illustrates an example schematic system block diagram for increasing a dejitter buffer based on voice gap data according to one or more embodiments.

Referring now to FIG. 5, illustrated is an example schematic system block diagram for increasing a dejitter buffer based on voice gap data according to one or more embodiments. At element 500 gap data related to a gap in voice packet data, wherein the gap is indicative of a lack of voice activity and the gap is related to a handover condition associated with a mobile device and other network devices related to a handover of a signal of a mobile device can be received. The voice gap data can include, but is not limited to, letters, pauses, silence, words, punctuation text, etc. The voice gap data can then be analyzed at element 502 to determine a type of the handover. The type of handover can comprise a case priority, intra-LTE plus intra-frequency, intra-LTE plus inter-frequency, IRAT WIFI to LTE, and/or a transmission time interval bundling. At element 504, a memory size of a dejitter buffer can be increased based on the gap data and the type of the handover resulting in an increased memory size of the dejitter buffer. The mobile device VoLTE stack can increase the memory size of the dejitter buffer by adding a cache of voice packets to be played during handovers while packet reception is interrupted. The increased dejitter buffer memory size can allow for late reception, reordering, and play out of voice packets buffered and forwarded during and after the handover process. Moreover, the increased memory size of the dejitter buffer can be proportional to the expected packet flow interruption for the handover type.

At element 506, the voice packet data can be stored to a capacity of the increased memory size of the dejitter buffer. Once the memory size of the dejitter buffer is determined, the VoLTE stack can defer play-out of voice packets for enough time to fill the dejitter buffer. This pace adjustment can be accomplished via gradual time-warping and voice activity gap manipulation. After element 506, other data related to the handover condition being satisfied can be sent to the mobile device at element 508. Therefore, after the increased dejitter buffer memory is filled with voice packet data, the mobile device VoLTE stack can send a response to the mobile device.

Figure 6:
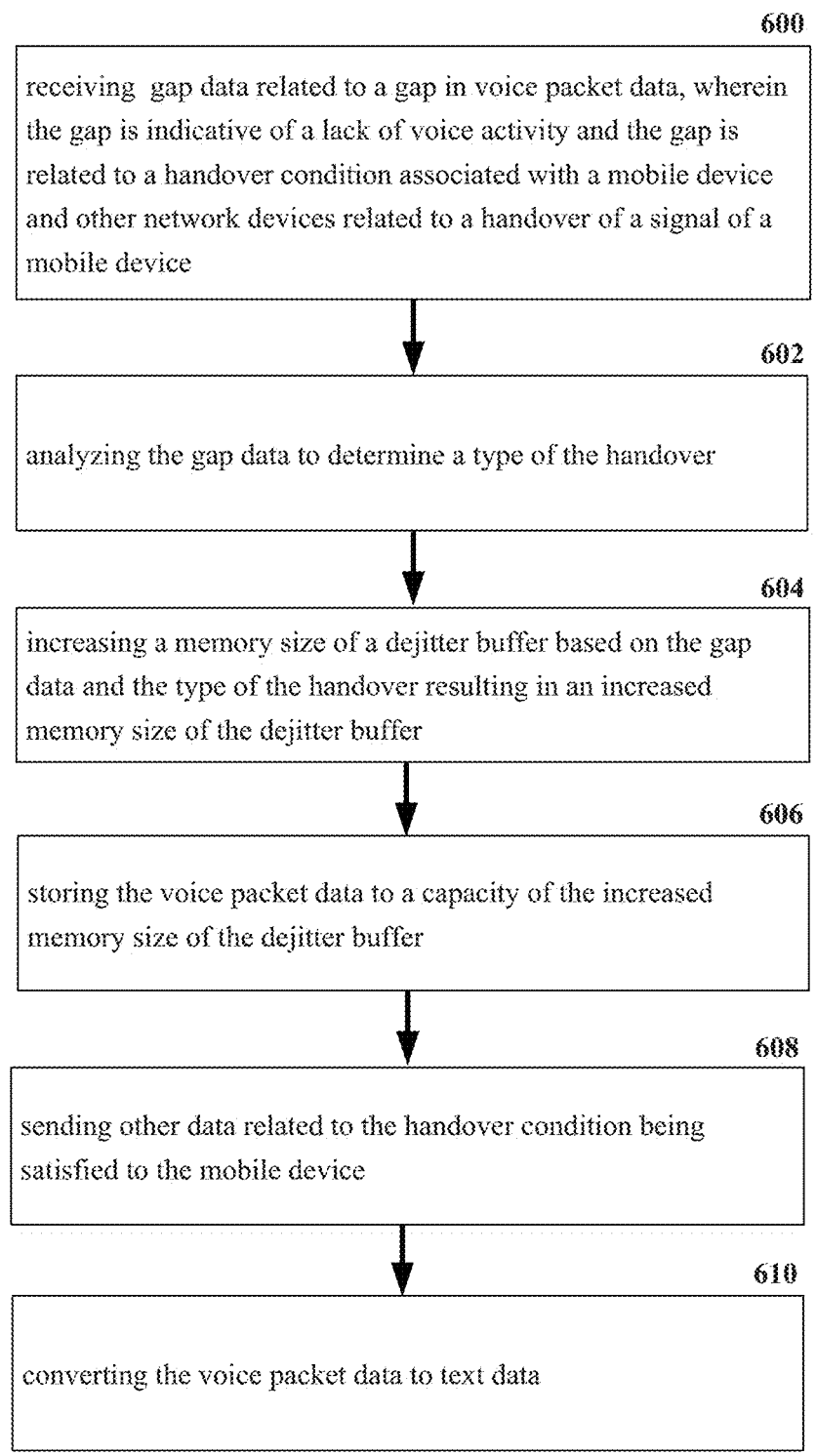
FIG. 6 illustrates an example schematic system block diagram for increasing a dejitter buffer based on voice gap data and converting the voice gap data to text data.

Referring now to FIG. 6, illustrated is an example schematic system block diagram for increasing a dejitter buffer based on voice gap data and converting the voice gap data to text data. At element 600 gap data related to a gap in voice packet data, wherein the gap is indicative of a lack of voice activity and the gap is related to a handover condition associated with a mobile device and other network devices related to a handover of a signal of a mobile device can be received. The voice gap data can include, but is not limited to, letters, pauses, silence, words, punctuation text, etc. The voice gap data can then be analyzed at element 602 to determine a type of the handover. The type of handover can comprise a case priority, intra-LTE plus intra-frequency, intra-LTE plus inter-frequency, IRAT WIFI to LTE, and/or a transmission time interval bundling. At element 604, a memory size of a dejitter buffer can be increased based on the gap data and the type of the handover resulting in an increased memory size of the dejitter buffer. The mobile device VoLTE stack can increase the memory size of the dejitter buffer by adding a cache of voice packets to be played during handovers while packet reception is interrupted. The increased dejitter buffer memory size can allow for late reception, reordering, and play out of voice packets buffered and forwarded during and after the handover process. Moreover, the increased memory size of the dejitter buffer can be proportional to the expected packet flow interruption for the handover type.

At element 606, the voice packet data can be stored to a capacity of the increased memory size of the dejitter buffer. Once the memory size of the dejitter buffer is determined, the VoLTE stack can defer play-out of voice packets for enough time to fill the dejitter buffer. This pace adjustment can be accomplished via gradual time-warping and voice activity gap manipulation. After element 606, other data related to the handover condition being satisfied can be sent to the mobile device at element 608. Therefore, after the increased dejitter buffer memory is filled with voice packet data, the mobile device VoLTE stack can send a response to the mobile device. The voice packet data can be converted into text data at element 610. Real-time predictive speech to text conversion can be used to compare sound (from microphone or to speaker) to a letter, word, and/or punctuation patterns. If the sounds match letters and words, then they can be converted to text and/or words or otherwise excluded. Predictive speech-to-text mechanisms can also look for ends of words, pauses, and ends of sentences to automatically add punctuation. They can detect intonation at ends of voice sounds to determine if the punctuation should be a comma, a period, or a question mark.

Figure 7:
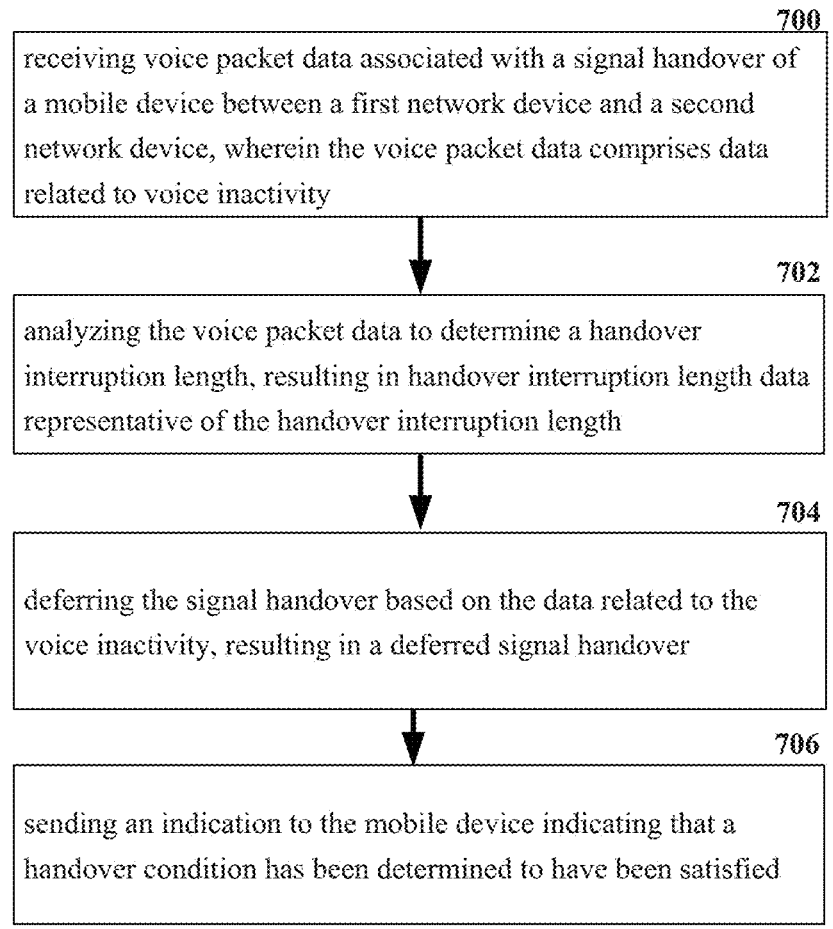
FIG. 7 illustrates an example schematic system block diagram for decreasing packet delay variation by increasing a dejitter buffer based on voice inactivity data according to one or more embodiments.

Referring now to FIG. 7, illustrated is an example schematic system block diagram for decreasing packet delay variation by increasing a dejitter buffer based on voice inactivity data according to one or more embodiments. At element 700, the system can receive voice packet data associated with a signal handover of a mobile device between a first network device and a second network device, wherein the voice packet data comprises data related to voice inactivity. The network devices can be mobile devices and cellular sites/base stations used to facilitate wireless communication with wireless devices. At element 702, the voice packet data can be analyzed to determine a handover interruption length, resulting in handover interruption length data representative of the handover interruption length. The type of handover interruption length can comprise intra-LTE plus intra-frequency, intra-LTE plus inter-frequency, IRAT WIFI to LTE, and/or a transmission time interval bundling.

At element 704, the system can defer the signal handover based on the data related to the voice inactivity, resulting in a deferred signal handover. The mobile device VoLTE stack can defer the signal handover to happen during voice inactivity to allow the jitter to go unnoticed. Additionally, an indication that the handover condition has been determined to have been satisfied can be sent to the mobile device at element 706.

Figure 8:
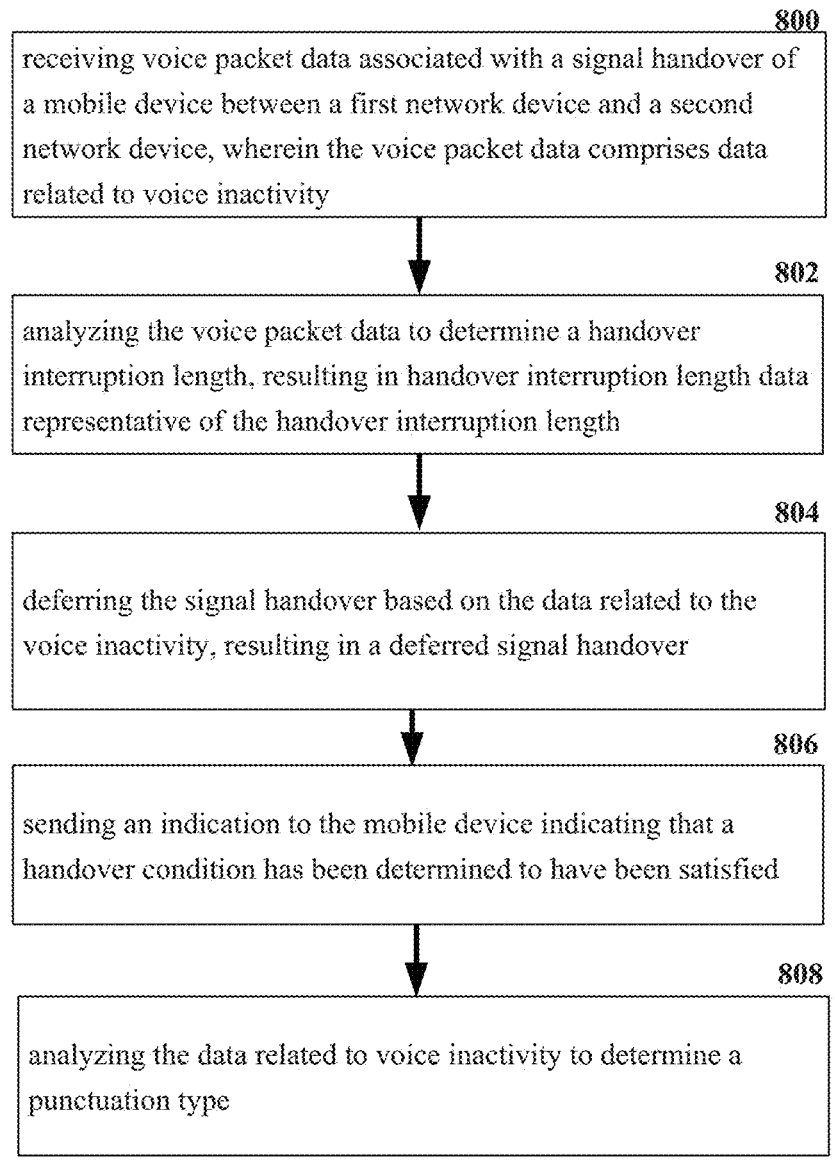
FIG. 8 illustrates an example schematic system block diagram for decreasing packet delay variation by determining a punctuation type and increasing a dejitter buffer based on voice inactivity data according to one or more embodiments.

Referring now to FIG. 8, illustrated is an example schematic system block diagram for decreasing packet delay variation by determining a punctuation type and increasing a dejitter buffer based on voice inactivity data according to one or more embodiments. At element 800, the system can receive voice packet data associated with a signal handover of a mobile device between a first network device and a second network device, wherein the voice packet data comprises data related to voice inactivity. The network devices can be mobile devices and cellular sites/base stations used to facilitate wireless communication with wireless devices. At element 802, the voice packet data can be analyzed to determine a handover interruption length, resulting in handover interruption length data representative of the handover interruption length. The type of handover interruption length can comprise intra-LTE plus intra-frequency, intra-LTE plus inter-frequency, IRAT WIFI to LTE, and/or a transmission time interval bundling.

At element 804, the system can defer the signal handover based on the data related to the voice inactivity, resulting in a deferred signal handover. The mobile device VoLTE stack can defer the signal handover to happen during voice inactivity to allow the jitter to go unnoticed. Additionally, an indication that the handover condition has been determined to have been satisfied can be sent to the mobile device at element 806. At element 808 a punctuation type can be determined by analyzing the data related to the voice inactivity.

Figure 9:
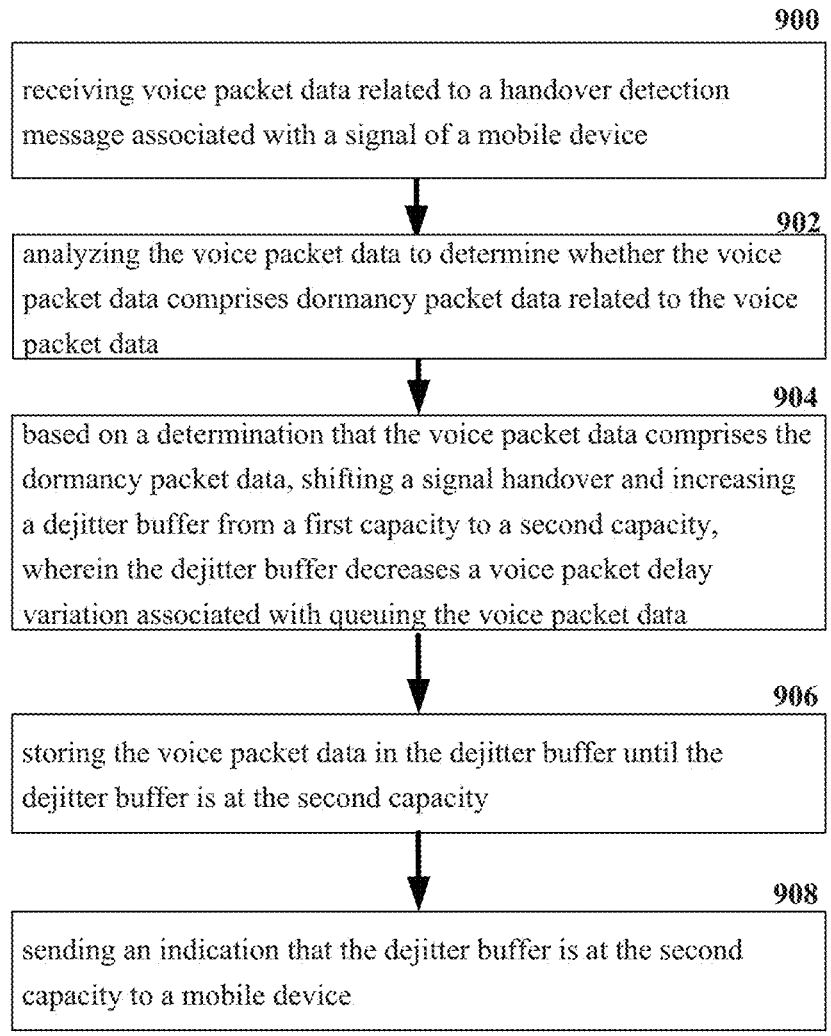
FIG. 9 illustrates an example schematic system block diagram for increasing a dejitter buffer based on dormancy packet data and decreasing packet delay variation according to one or more embodiments.

Referring now to FIG. 9, illustrated is an example schematic system block diagram for increasing a dejitter buffer based on dormancy packet data and decreasing packet delay variation according to one or more embodiments. At element 900 voice packet data related to a handover detection message associated with a handover of a mobile device signal can be received. The data can include, but is not limited to, handover measurement data, frequency data, and signal strength data. The voice packet data can be analyzed at element 902 to determine whether the voice packet data comprises dormancy packet data related to the voice packet data. The dormancy packet data can include, but is not limited to, letters, pauses, silence, words, punctuation text, etc. The voice packet data size information can comprise intra-LTE plus intra-frequency, intra-LTE plus inter-frequency, IRAT WIFI to LTE, and/or a transmission time interval bundling. At element 904, based on a determination that the voice packet data comprises the dormancy packet data, shifting a signal handover and increasing a dejitter buffer from a first capacity to a second capacity. The mobile device VoLTE stack can increase the memory size of the dejitter buffer by adding a cache of voice packets to be played during handovers while packet reception is interrupted. The increased dejitter buffer memory size can allow for late reception, reordering, and play-out of voice packets buffered and forwarded during and after the handover process. Moreover, the increased memory size of the dejitter buffer can be proportional to the expected packet flow interruption for the handover type. The dejitter buffer can also decrease a packet delay variation associated with queuing the voice packet data at element 904.

The voice packet data can be stored in the dejitter buffer until the dejitter buffer is at the second capacity at element 906. Once the memory size of the dejitter buffer is determined, the VoLTE stack can defer play out of voice packets for enough time to fill the dejitter buffer. This pace adjustment can be accomplished via gradual time-warping and voice activity gap manipulation. At element 908, an indication that the dejitter buffer is at the second capacity can be sent to a mobile device. When the dejitter buffer is filled with voice packets, the mobile device VoLTE stack can send a response message to another mobile device radio. Upon reception of a "ready for handover" response the other mobile device radio can then forward a measurement report to an eNB, thus initiating a traditional handover process.

Figure 10:
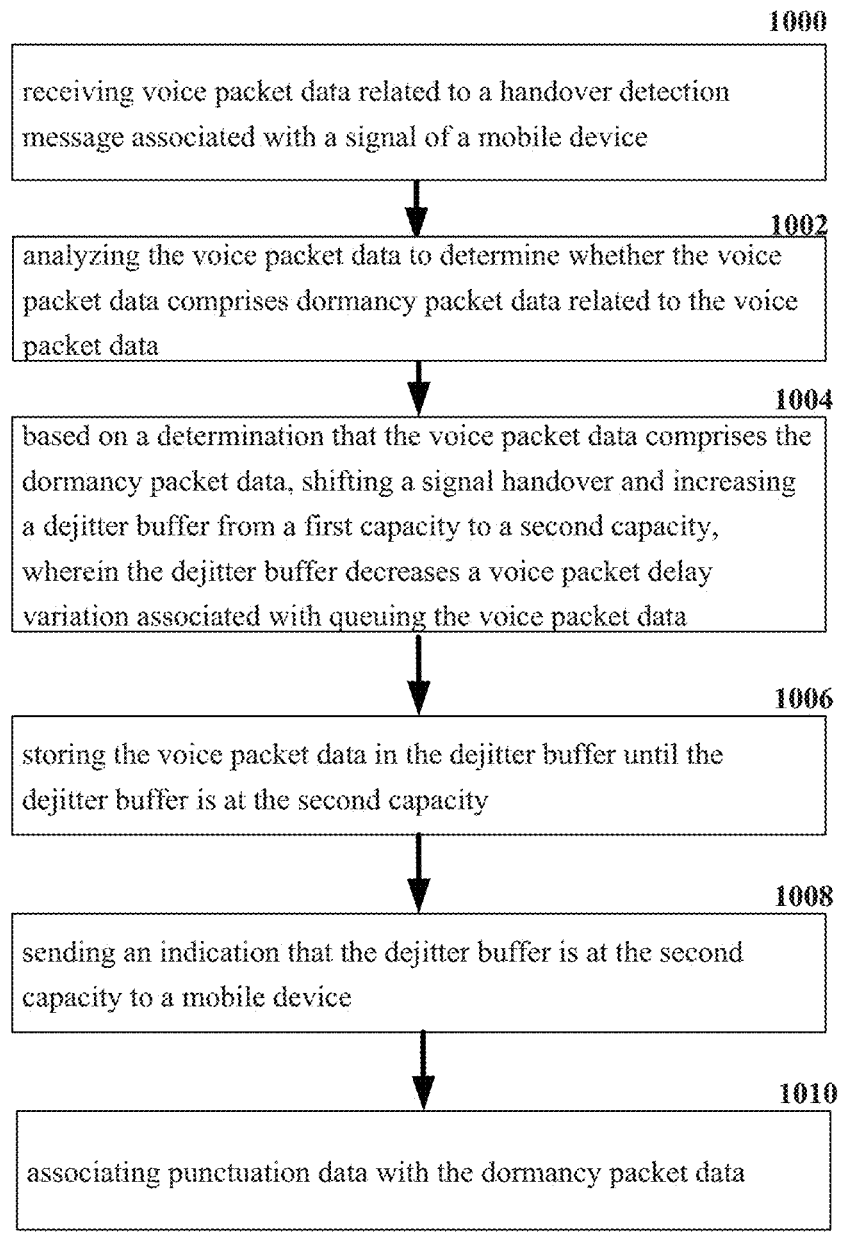
FIG. 10 illustrates an example schematic system block diagram for increasing a dejitter buffer based on dormancy packet data, associating punctuation data with the dormancy packet data, and decreasing packet delay variation according to one or more embodiments.

Referring now to FIG. 10, illustrated is an example schematic system block diagram for increasing a dejitter buffer based on dormancy packet data, associating punctuation data with the dormancy packet data, and decreasing packet delay variation according to one or more embodiments. At element 1000 voice packet data related to a handover detection message associated with a handover of a mobile device signal can be received. The data can include, but is not limited to, handover measurement data, frequency data, and signal strength data. The voice packet data can be analyzed at element 1002 to determine whether the voice packet data comprises dormancy packet data related to the voice packet data. The dormancy packet data can include, but is not limited to, letters, pauses, silence, words, punctuation text, etc. The voice packet data size information can comprise intra-LTE plus intra-frequency, intra-LTE plus inter-frequency, IRAT WIFI to LTE, and/or a transmission time interval bundling. At element 1004, based on a determination that the voice packet data comprises the dormancy packet data, shifting a signal handover and increasing a dejitter buffer from a first capacity to a second capacity. The mobile device VoLTE stack can increase the memory size of the dejitter buffer by adding a cache of voice packets to be played during handovers while packet reception is interrupted. The increased dejitter buffer memory size can allow for late reception, reordering, and play out of voice packets buffered and forwarded during and after the handover process. Moreover, the increased memory size of the dejitter buffer can be proportional to the expected packet flow interruption for the handover type. The dejitter buffer can also decrease a packet delay variation associated with queuing the voice packet data at element 1004.

The voice packet data can be stored in the dejitter buffer until the dejitter buffer is at the second capacity at element 1006. Once the memory size of the dejitter buffer is determined, the VoLTE stack can defer play out of voice packets for enough time to fill the dejitter buffer. This pace adjustment can be accomplished via gradual time-warping and voice activity gap manipulation. At element 1008, an indication that the dejitter buffer is at the second capacity can be sent to a mobile device. When the dejitter buffer is filled with voice packets, the mobile device VoLTE stack can send a response message to another mobile device radio. Upon reception of a "ready for handover" response the other mobile device radio can then forward a measurement report to an eNB, thus initiating a traditional handover process. At element 1010, punctuation data can be associated with the dormancy packet data. The punctuation data can comprise commas, periods, question marks, etc.

Figure 11:
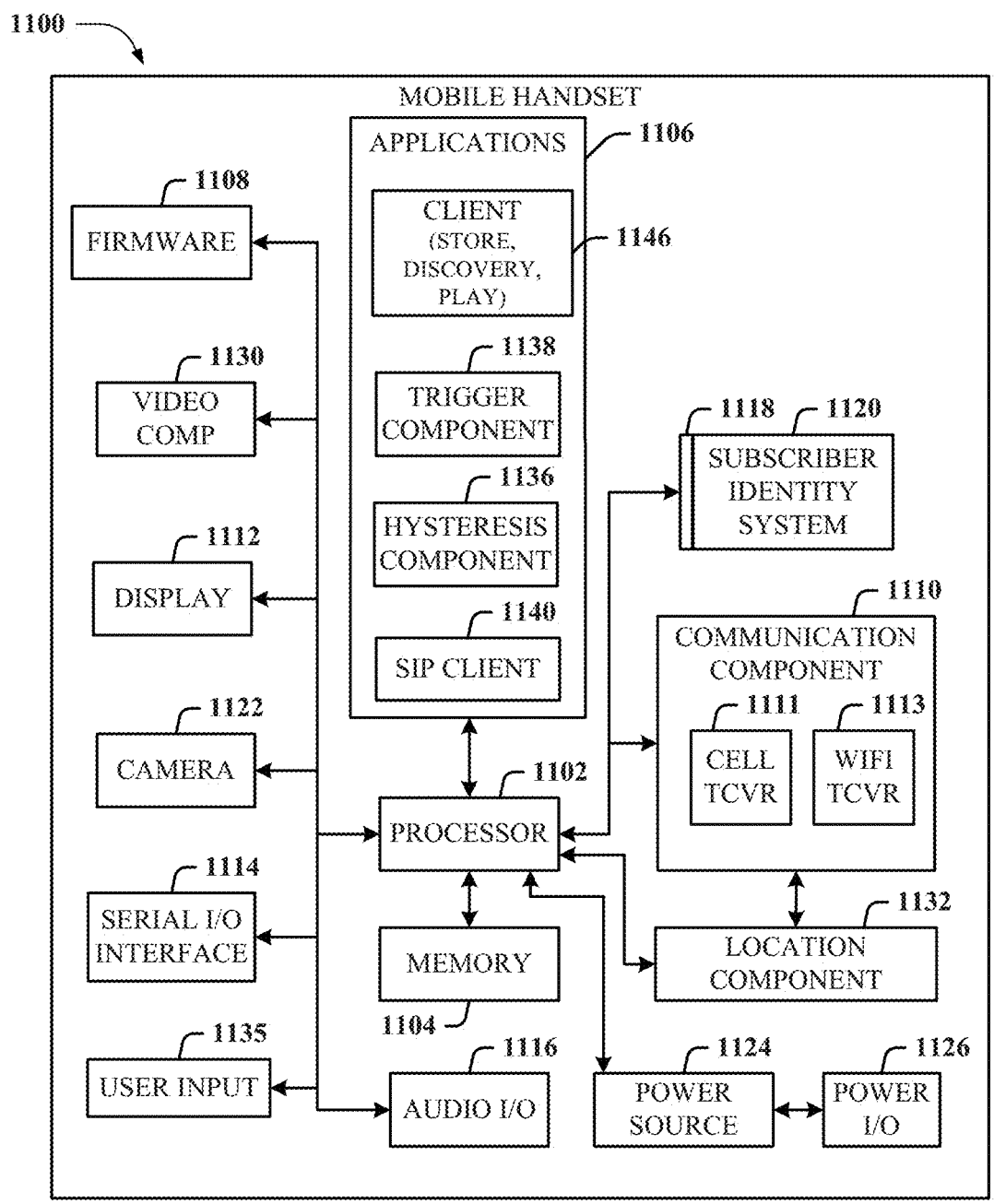
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a computer readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
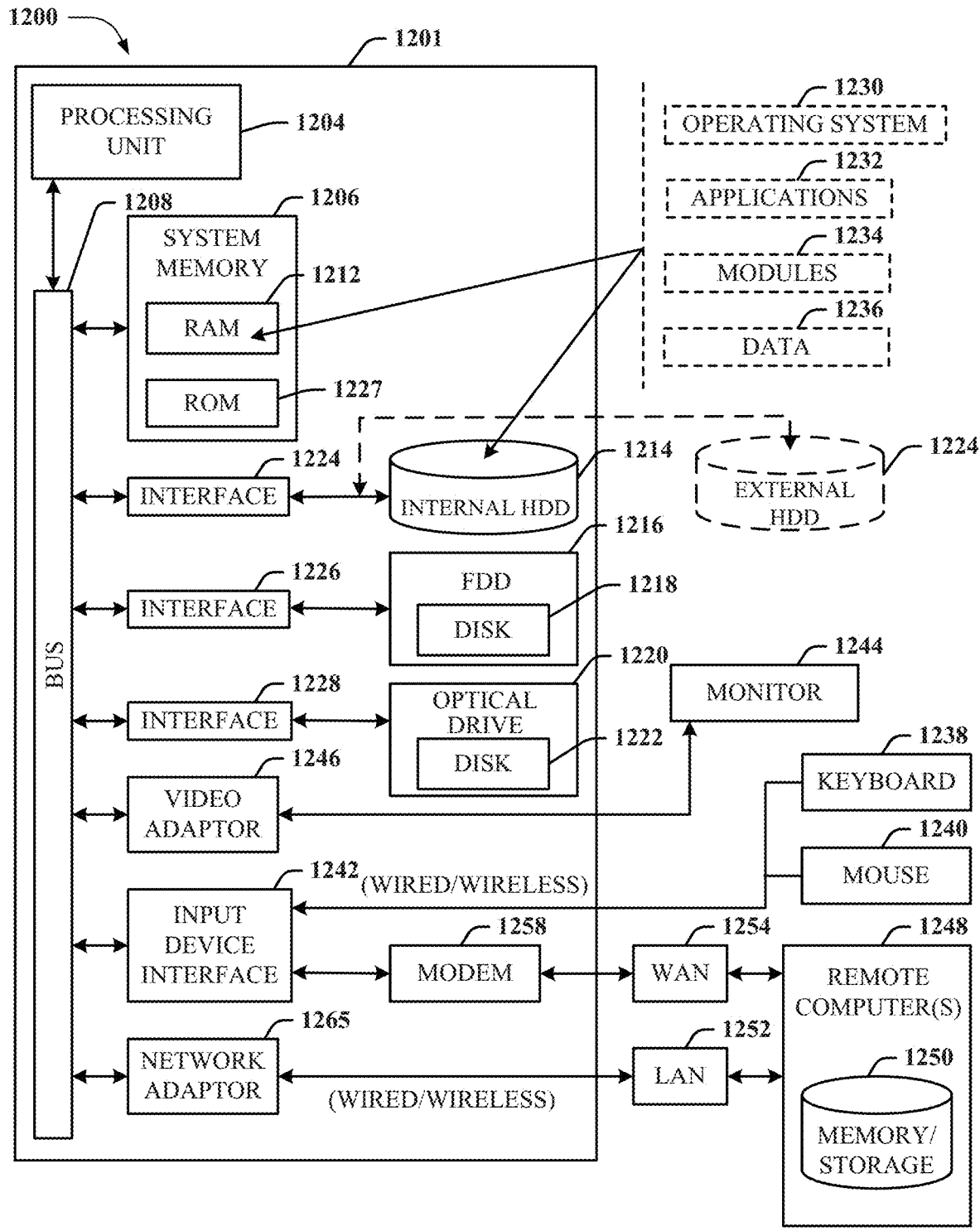
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1211 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the serial port interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
accessing, by a first network device comprising a processor, gap data related to a gap in voice packet data, wherein the gap is indicative of a lack of a voice activity and the gap is related to a handover condition associated with a mobile device and network devices other than the first network device, wherein the handover condition is related to a handover of a signal of the mobile device from being communicated from the first network device to being communicated from a second network device of the network devices;
analyzing, by the first network device, the gap data to determine a punctuation type;
based on the punctuation type, deferring, by the first network device, the handover of the signal, resulting in a deferred handover of the signal;
based on the gap data, increasing, by the first network device, a memory size of a dejitter buffer, resulting in an increased memory size of the dejitter buffer; and
analyzing, by the first network device, text data associated with the voice packet data to verify the punctuation type is represented in the text data.

2. The method of claim 1, further comprising:
sending, by the first network device, data related to the handover condition being satisfied to the mobile device.

3. The method of claim 1, further comprising:
storing, by the first network device, the voice packet data to fill a capacity of the increased memory size of the dejitter buffer.

4. The method of claim 1, wherein the punctuation type is a comma type.

5. The method of claim 1, further comprising:
generating, by the first network device, text data based on the voice packet data, wherein the text data comprises punctuation data representative of a punctuation.

6. The method of claim 5, wherein the generating being performed is an indication of the voice activity having occurred.

7. The method of claim 1, further comprising:
based on the punctuation type, predicting, by the first network device, the gap in the voice packet data.

8. A system, comprising:
a processor; and
a memory that stores executable instructions that, when executed by the processor, facilitate performance of operations, comprising:
receiving voice packet data associated with a signal transfer of a mobile device from being connected to a first network device to being connected to a second network device, wherein the voice packet data comprises data related to a voice inactivity, and wherein the signal transfer is to occur at a first time;
analyzing the data related to the voice inactivity to determine a punctuation type;
in response to the punctuation type being determined by the analyzing, deferring the signal transfer based on the data related to the voice inactivity, resulting in a deferred signal transfer to occur at a second time after the first time; and
converting the punctuation type to text data, wherein the text data comprises punctuation data representative of the punctuation.

9. The system of claim 8, wherein the operations further comprise:
generating an indication indicative of a transfer condition being determined to have been satisfied.

10. The system of claim 8, wherein the operations further comprise:
determining a transfer interruption length, resulting in transfer interruption length data representative of the transfer interruption length.

11. The system of claim 8, wherein the converting is performed in response to the voice inactivity being determined to have occurred.

12. The system of claim 8, wherein the operations further comprise:
generating an indication that the second network device is ready for the signal transfer.

13. The system of claim 8, wherein the operations further comprise:
receiving distance data in relation to respective distances of the mobile device to the first network device and the second network device.

14. The system of claim 8, wherein the operations further comprise:
in response to the converting the punctuation type to the text data, initiating the signal transfer between the first network device and the second network device.

15. A non-transitory machine-readable medium, comprising executable instructions that, when executed by a processor, facilitate performance of operations, comprising:
receiving voice packet data related to a network device transfer detection message associated with a signal of a mobile device;
based on a determination, in response to the receiving, that the voice packet data comprises dormancy packet data related to the voice packet data, increasing a dejitter buffer from a first capacity to a second capacity, wherein the dejitter buffer decreases a voice packet delay variation associated with queuing the voice packet data as compared to without the dejitter buffer; and
in response to the determination, converting the voice packet data to text data, wherein the text data comprises punctuation data representative of a punctuation type.

16. The non-transitory machine-readable medium of claim 15, wherein the determination is a first determination, and wherein the operations further comprise:
based on a second determination of a punctuation type from the dormancy packet data, deferring a signal network device transfer based on the dormancy packet data, resulting in a deferred signal network device transfer.

17. The non-transitory machine-readable medium of claim 15, wherein the operations further comprise:
storing the voice packet data in the dejitter buffer until the dejitter buffer is determined to be at the second capacity.

18. The non-transitory machine-readable medium of claim 15, wherein the operations further comprise:
sending an indication that the dejitter buffer is at the second capacity to the mobile device.

19. The non-transitory machine-readable medium of claim 15, wherein the operations further comprise:
associating punctuation data with the dormancy packet data, and wherein the punctuation data comprises the punctuation type.

20. The non-transitory machine-readable medium of claim 15, wherein the increasing the dejitter buffer is proportional to a value associated with the punctuation type.

\* \* \* \* \*